(12) United States Patent
Comini et al.

(10) Patent No.: US 11,785,683 B2
(45) Date of Patent: Oct. 10, 2023

(54) CALIBRATION DEVICE FOR AN OPTICAL DETECTOR AND SETTING DEVICE FOR SETTING CALIBRATION POINTS FOR THE CALIBRATION DEVICE

(71) Applicant: MERCK PATENT GMBH, Darmstadt (DE)

(72) Inventors: Fabrice Comini, Sélestat (FR); Frederick G. Bargoot, Wellesley, MA (US); Victor Etre, Westborough, MA (US)

(73) Assignee: MERCK PATENT GmbH, Darmstadt (DE)

( * ) Notice: Subject to any disclaimer, the term of this patent is extended or adjusted under 35 U.S.C. 154(b) by 43 days.

(21) Appl. No.: 15/734,942

(22) PCT Filed: May 29, 2019

(86) PCT No.: PCT/EP2019/063907
§ 371 (c)(1),
(2) Date: Dec. 3, 2020

(87) PCT Pub. No.: WO2019/233837
PCT Pub. Date: Dec. 12, 2019

(65) Prior Publication Data
US 2021/0231573 A1    Jul. 29, 2021

(30) Foreign Application Priority Data

Jun. 4, 2018 (EP) ..................................... 18290060

(51) Int. Cl.
*H05B 45/10* (2020.01)
*G01N 21/27* (2006.01)
(Continued)

(52) U.S. Cl.
CPC ........... *H05B 45/10* (2020.01); *G01N 21/278* (2013.01); *G01N 21/93* (2013.01); *H05B 45/12* (2020.01)

(58) Field of Classification Search
CPC ...... H05B 45/10; H05B 45/12; G01N 21/278; G01N 21/93; G01N 21/763
See application file for complete search history.

(56) References Cited

U.S. PATENT DOCUMENTS 5,489,771 A     2/1996  Beach et al.
6,140,776 A    10/2000  Rachwal
(Continued)

FOREIGN PATENT DOCUMENTS

EP      0984270 B1     9/2003
EP      2108942 A1    10/2009
(Continued)

OTHER PUBLICATIONS

International Search Report PCT/EP2019/063907 dated Sep. 3, 2019 (pp. 1-5).
(Continued)

*Primary Examiner* — Minh D A
(74) *Attorney, Agent, or Firm* — Millen, White, Zelano & Branigan, P.C.; Ryan R. Pool

(57) ABSTRACT

The present invention provides a calibration device for an optical detector comprising a light emitting diode 1, and an electronic circuit 3 for driving the light emitting diode 1, wherein the electronic circuit 3 is a constant current generator configured to supply a constant driving current to the light emitting diode 1 in the range of 0.5 to 25 µA. Furthermore, the present invention provides a setting device for setting at least one calibration point for a calibration device as described above. The setting device comprises a light detector 51 configured to output a signal representing (Continued)

the light emission intensity of a calibration device under examination, a controller 53 for controlling the constant driving current of the calibration device under examination, and a calibration point setting means 55 for setting at least one calibration point for the calibration device under examination.

11 Claims, 4 Drawing Sheets

(51) Int. Cl.
*H05B 45/12* (2020.01)
*G01N 21/93* (2006.01)

(56) References Cited

U.S. PATENT DOCUMENTS

| | | | |
|---|---|---|---|
| 7,182,912 | B2 | 2/2007 | Carey et al. |
| 7,456,812 | B2 | 11/2008 | Smith et al. |
| 2003/0146663 | A1 | 8/2003 | Nelson et al. |
| 2010/0091273 | A1 | 4/2010 | Egli et al. |
| 2011/0084614 | A1* | 4/2011 | Eisele .................... H05B 45/00 315/297 |
| 2015/0305118 | A1* | 10/2015 | Beghelli ................ H05B 47/11 315/158 |
| 2016/0165734 | A1* | 6/2016 | Khalid ........................ B41J 2/45 315/76 |
| 2017/0127491 | A1* | 5/2017 | Pope ...................... H05B 45/12 |
| 2018/0070419 | A1* | 3/2018 | Girard .................. H05B 47/195 |

FOREIGN PATENT DOCUMENTS

| | | |
|---|---|---|
| JP | H0527901 A | 2/1993 |
| JP | H0530185 A | 2/1993 |
| JP | H07162597 A | 6/1995 |
| JP | H08115479 A | 5/1996 |
| JP | 2005507512 A | 3/2005 |
| JP | 2009214789 A | 9/2009 |

OTHER PUBLICATIONS

Office Action in corresponding JP appl. 2020-567506 dispatched Mar. 1, 2023 (pp. 1-7) and english translation thereof.
Office Action in corresponding JP appln. No. 2020-567506 dispatched Aug. 22, 2023 (1 page).

* cited by examiner

CALIBRATION DEVICE FOR AN OPTICAL DETECTOR AND SETTING DEVICE FOR SETTING CALIBRATION POINTS FOR THE CALIBRATION DEVICE

The present invention is directed to a calibration device for an optical detector and to a setting device for setting calibration points for such a calibration device.

In recent years the emission of bioluminescent or fluorescent light has been proven to be a useful tool for chemical and biological analyses of various samples. For example, Adenosine triphosphate (ATP) is a good indicator molecule for biological residues due to its universal presence in all living cells. In the presence of the enzyme luciferase, ATP reacts and a light-emitting pigment luciferin provides an emission of photons. This can be used for testing a sample with regard to microbiological contaminations, e.g. the quality of cleaning processes in food and beverage production plants. The method allows for the testing of surfaces, process water such as cooling water as well as diesel and kerosene fuels. Under optimum conditions the amount of light is directly proportional to the amount of ATP present in the sample, allowing for the provision of quantitative results. Examples for applocations are surface monitoring, CIP water testing, hygiene monitoring, fuel testing, metal working fluids, biocide efficacy testing, paint testing, quality assurance, e-coat testing.

Usually the cleanliness is measured in relative light units (RLU). Although the RLU value will vary depending on the analysis method and particular measuring device, the RLU value obtained by one specific measuring device will be proportional to the degree of contamination and can be used to control the cleanliness of a product.

In order however to make these RLU values in practice comparable a reliable calibration for the measuring devices is required.

In view of the above there is a demand for a reliable calibration light source providing a constant illumination level, which can be used for the calibration of measuring devices in the above context. Hereby it has to be considered that the amount of light needed for the calibration is rather small.

In order to address this issue two different approaches have been used. One approach was to drive an LED based light source with a constant voltage in the range of several Volts, resulting in a driving current in the range of several mA, and to provide an optical filter or aperture to reduce the amount of emitted light. These kinds of calibration devices usually comprise integrated photodiodes and a feedback control system so as to stabilize the light output of the LED device itself.

However, since the output of an LED is greatly influenced by the temperature, which will rise due to the relatively high power consumption, it is difficult to provide a stable and reliable calibration device with this technique.

EP 0 984 270 A1 discloses an example of a corresponding calibration device.

As an alternative of using optical filters or apertures in order to reduce the amount of light, it was suggested to drive a LED by means of a pulsed voltage. This however increases the temperature within the device as well. Furthermore, the control circuit for providing this kind of pulsed output is relatively complex, making the device expensive.

In view of the above it is the object of the present invention to provide a calibration device for an optical detector having a simple construction and allowing a reliable calibration. Furthermore, it is an object of the present invention to provide a setting device for setting calibration points of the calibration device.

The above objects are achieved by means of a calibration device according to claim 1 and by a setting device according to claim 12. The dependent claims are directed to different advantageous aspects of the invention.

Especially, the present invention provides a calibration device for an optical detector comprising a light emitting diode, and an electronic circuit for driving the light emitting diode, wherein the electronic circuit is a constant current generator configured to supply a constant driving current to the light emitting diode in the range of 0.5 to 25 $\mu A$.

In the calibration device the driving current is preferably in the range of 1 to 10 $\mu A$, further preferably 1.5 to 4.5 $\mu A$ and most preferably 2 to 4 $\mu A$.

The calibration device can further comprise a diffusor surrounding the light emitting diode, for surely directing the light to the corresponding detector.

The calibration device can further comprise a switching device arranged so as to energise the light emitting diode upon an axial compression of a pen like casing accommodating the light emitting diode.

The calibration device can further comprise a setting unit for setting the driving current or a plurality of driving currents.

The calibration device can further be configured so that the setting unit comprises an interface for connecting an external current controller for controlling the setting of the constant driving current based on a feed-back control using a light detector or sensor, for measuring the light output of the light emitting diode.

The calibration device can further be configured so that the current generator is switchable between a plurality of predetermined constant driving currents.

The calibration device can further be configured so that the current generator comprises a first operational amplifier and a shunt resistor, wherein the shunt resistor is connected in series with the light emitting diode, and wherein the first operational amplifier is connected to compare a set input voltage with a voltage obtained based on a voltage drop across the shunt resistor.

The calibration device can further be configured so that the current generator further comprises a second operational amplifier connected as a low pass filter at a first node between the output of the first operational amplifier and the shunt resistor.

The calibration device can further be configured so that the current generator further comprises a third operational amplifier connected as voltage follower at a node between the shunt resistor and the light emitting diode.

The calibration device can further be configured so that the outputs of the second and third operational amplifiers are connected via respective resistors with the inverting input of the first operational amplifier.

Furthermore, the invention provides a setting device for setting at least one calibration point for a calibration device as described above. The setting device comprises a light detector configured to output a signal representing the light emission intensity of a calibration device under examination, a controller for controlling the constant driving current of the calibration device under examination, a calibration point setting means for setting at least one calibration point for the calibration device under examination.

In the following the invention is described with reference to the accompanying drawings, which show:

In the following preferred embodiments of the invention will be described with reference to the accompanying drawings in detail.

Figure 1:
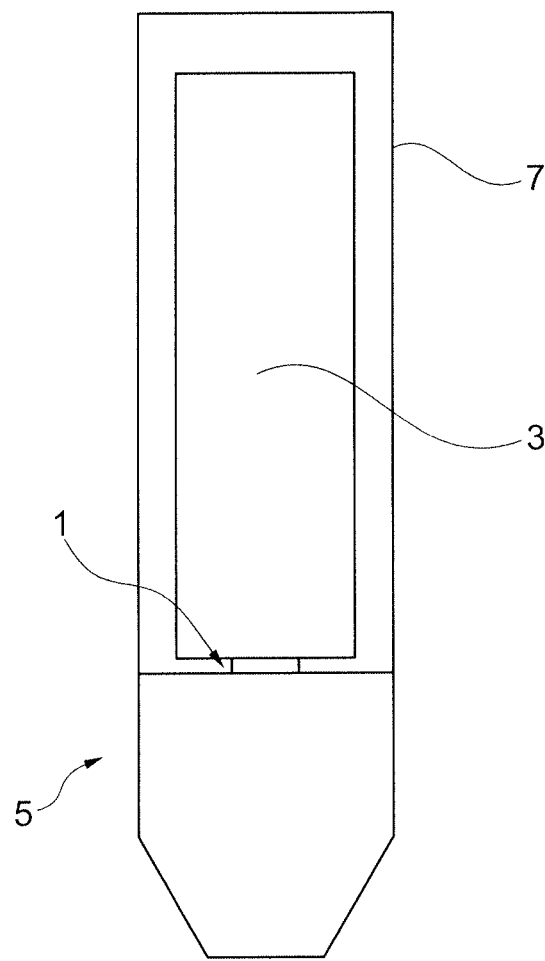
FIG. 1 a schematic view of a calibration device according to the invention.

As shown in FIG. 1, a calibration device according to his invention is provided with a casing 7 having the shape of a pen.

The pen like casing 7 accommodates a light-emitting diode (LED) 1 and an electronic circuit 3 for driving the light emitting diode 1. Additionally, the pen like casing 7 can accommodate an energy source, like a capacitor, a secondary cell or a battery, to power the electronic circuit for driving the light-emitting diode 1.

Furthermore, as shown in FIG. 1, the light emitting diode 1 is provided within the pen like casing 7 surrounded by the diffusor 5, that is as semi-transparent area of the pen like casing 7, allowing the light emitted from the light emitting diode 1 to be irradiated to the outside of the pen like casing 7.

The pen like casing 7 is formed resembling the usual form of a sample collecting devices, like a phial or a test-tube. The dimensions of the pen like casing 7 are such that it can be accommodated within an optical detector system for the inspection of bioluminescence.

It is important for a reference light source to be representative of the light emitted by the real sample in practical use.

For this propose the calibration device, respectively the reference light source is designed to have the same shape and to emit light only from a dedicated area as the real sample.

The luminous intensity of a light-emitting diode 1 is directly proportional to the current applied through its junction.

According to the invention a controlled current source generates a low current thought the light-emitting diode 1.

The stabilized current source is advantageous over a voltage drop resistor because a forward voltage of the light-emitting diode 1 is temperature dependent and may lead to 13% variation within the range 278K to 308K.

Compared to light source drives with luminescence feedback, where the light emission must be large enough to create a signal on a luminescence measuring device (photodiode, phototransistor . . . ), the current controlled light-emitting diode 1 generates directly a low luminance in open loop mode.

Even so the temperature still influences the luminance intensity of the light-emitting diode 1 (about 16% in the range 136K to 375K2) mainly due to carrier lifetime change.

However, this effect is acceptable, when considering that typically the detection devices operate only within the range 278K to 308K and are calibrated mainly at 295K. As the light-emitting diode 1 is driven with very low current the diode self-heating can be neglected.

According to the invention the driving current of the light-emitting diode is set to be in the range of 0.5 to 25 µA.

Preferably, the driving current is in the range of 1 to 10 µA, more preferably 1.5 to 4.5 µA and most preferably 2 to 4 µA.

In this range the amount of light emitted by the light-emitting diode 1 is directly proportional to the driving current flowing through the light-emitting diode 1.

The low current source proposed allows the light-emitting diode 1 to be supplied with a constant current regardless of any variation of its forward voltage drop.

It should be kept in mind that the driving current has an exponential dependency from the driving voltage, so that a small variation of the voltage might cause a huge change of the driving current. This problem however can be avoided by the use of a constant current generator 3 as described herein.

Figure 2:
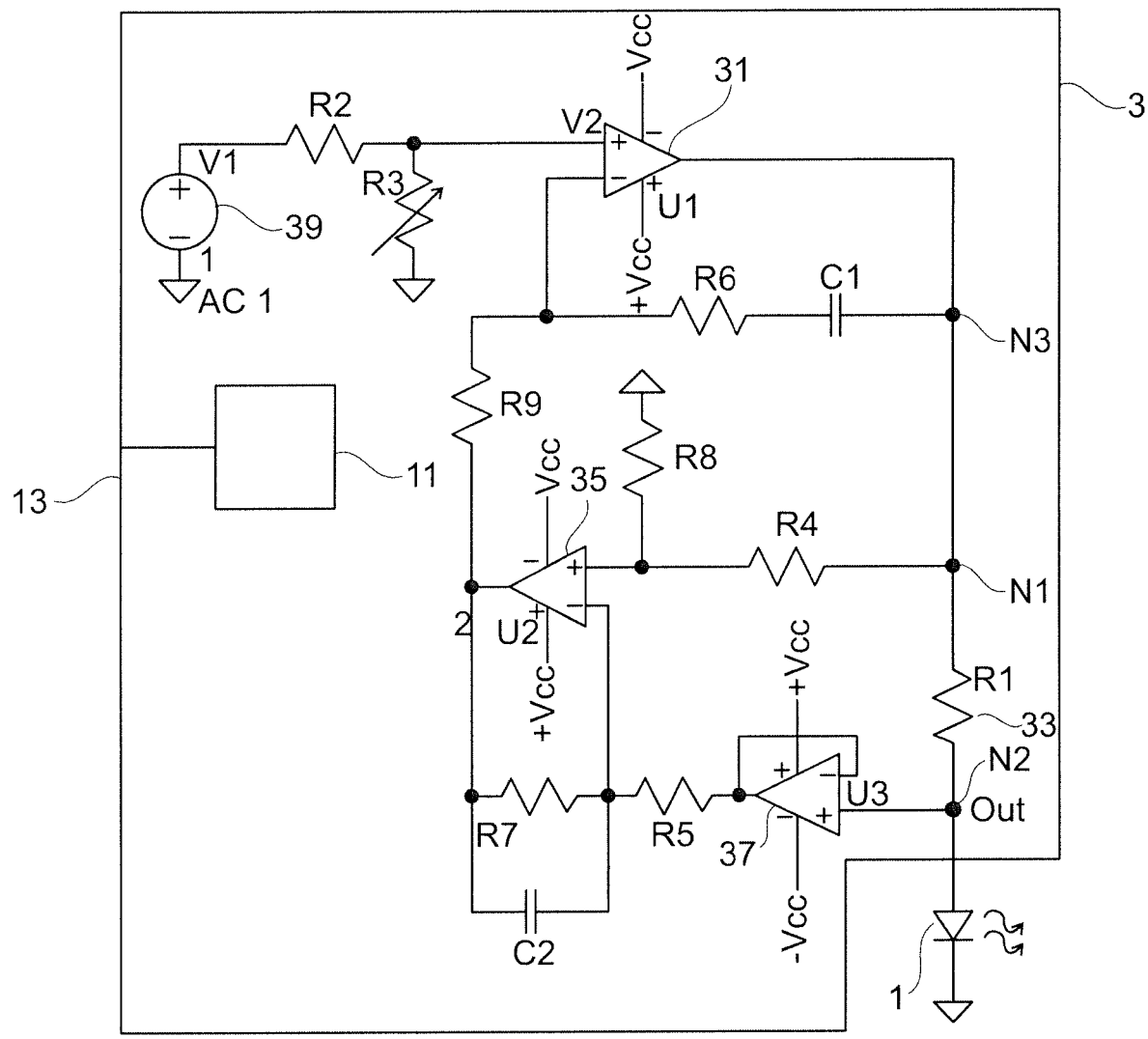
FIG. 2 a circuit diagram of the constant current generator of the calibration device of the invention.

An example of the configuration of a corresponding constant current generator 3 is shown in FIG. 2.

The electrical power source 39, like a secondary cell, a battery or a capacitor, is connected via a resistor R2 with the non-inverting input of a first operational amplifier 31. The additional resistor R3, which can be a controllable or variable resistor or a potentiometer, and which is connected between the resistor R2 and ground will act together with the resistor R2 as a voltage divider so as to set a voltage V2 at the non-inverting input of the first operational amplifier 31.

The output of the first operational amplifier 31 is connected via a shunt resistor 33 (R1) with the input of the light-emitting diode 1, the output thereof is connected to ground.

Furthermore, a first capacitor C1 and a resistor R6 are connected in series between a node N3 connected with the output of the first operational amplifier 31, and the inverting input of the first operational amplifier 31, for stabilizing the output of the first operational amplifier 31.

Then constant current generator 3 of FIG. 2 is further provided with a second operational amplifier 35, which together with a second capacitor C2 and a further resistor R7, connected in parallel to each other, form a low-pass filter.

The noninverting input of the second operational amplifier 35 is connected via a voltage divider, formed by resistors R4 and R8, with a node N1, provided between the output of the first operational amplifier 31 and the input of the shunt resistor 33.

The output of this second power amplifier 35 is connected via a resistor R9 with the inverting input of the first operational amplifier 31.

The inverting input of the second operational amplifier 35, on the other hand, is connected via a resistor R5 with the output of a third operational amplifier 37.

The third operational amplifier 37 is configured as a voltage follower, that is the output thereof is fed back to the inverting input of the third operational amplifier 37.

The noninverting input of the third operational amplifier 37 is connected with a further node N2, provided at the output side of the shunt resistor 33 and at the input side of the light-emitting diode 1.

With this configuration the voltage V2 at the noninverting input of the first operational amplifier 31 is compared with a second voltage obtained from the voltage drop occurring at the shunt resistor 33, to which the driving current is applied.

By an appropriate setting of the values of the resistors R1 to R9, the capacitors C1 and C2 and on the electrical power source 39 it is possible to obtain a highly stable driving current flowing through the light-emitting diode 1 and having a volume in the range between 0.5 and 25 µA.

With the very low intensity supply to the LED by the constant current generator 3 it is possible to drive the light-emitting diode 1 without generating excessive heat, so that the light output is stable and in the desired range of few RLU (relative light units) of the typical detecting device for the bioluminescence of ATP.

As shown in FIG. 2 the constant current converter 3 can be provided with a setting means 11 for setting the driving current through the light-emitting diode 1 by controlling the voltage V2 at the non-inverting input of the first operational amplifier 31.

This can be done by either controlling the electrical power source 39 or by controlling the resistors R2 and R3, working as a voltage divider. For example, instead of the adjustable resistor R3 it is possible to provide a plurality of switchable resistors connected in parallel between the non-inverting input of the first operational amplifier 31 and ground and to control the respective switches in order to set a predetermined voltage as V2.

A corresponding setting means 11 will preferably be provided with an interface for receiving setting signals from the outside, either by manual operation or by an electronic signal.

Figure 3:
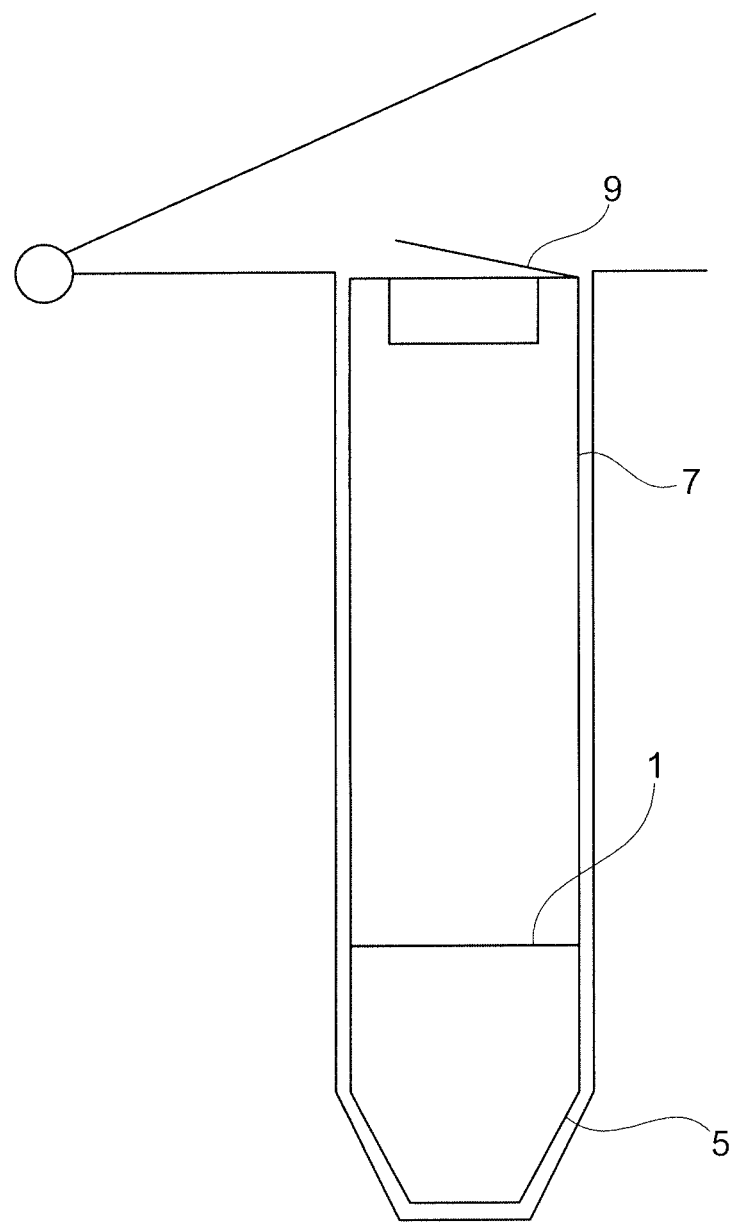
FIG. 3 a schematic view of a calibration device according to a further embodiment of the invention.

FIG. 3 shows a further embodiment of the calibration device of the present invention.

The calibration device of FIG. 3 differs from the previously described embodiment in so far as that a spring biased switch is provided on one end of the pen like casing 7. This switch is operated by closing the lid of a detecting device and will switch the voltage V2 applied to the first operational amplifier 31. That is, the calibration device of FIG. 3 will emit light only when mounted in the detecting device with the lid closed. This configuration will help to save energy of a battery, powering the calibration device, and will help to prevent any heating of the calibration device due to an unintended continuous operation over a long time. It will further make sure that the calibration is not affected by stray light from the environment.

Figure 4:
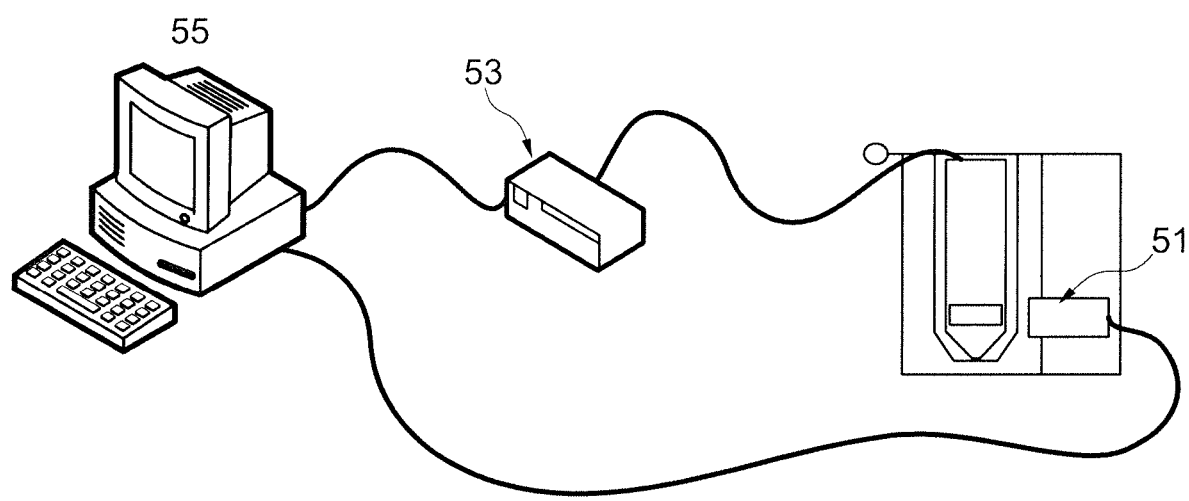
FIG. 4 the principal configuration of a setting device for the calibration device.

Finally, FIG. 4 shows a setting device for setting one or more calibration points for the calibration device according to any of the above embodiments.

As shown in FIG. 4 the setting device comprises a light detector 51, like a photomultiplier. The light detector 51 is provided in a housing 57 equipped with means for receiving the calibration device as described before. The light detector 51 is arranged at a position so that the light detector 51 will receive the light emitted from the calibration device.

This signal, outputted by the light detector 51 is delivered to a calibration point setting means 55 for further processing. The calibration point setting means 55 might be implemented as a computer.

Additionally, the setting device of the invention is equipped with a controller 53, which is connected with the calibration device under examination.

In the preferred embodiment additionally the controller 53 is connected with the calibration point setting means 55 as well. In this way, a feedback control is implemented. That is, the controller 53 will set the driving current to be applied to the light-emitting diode 1 of the calibration device. The light detector 51 will report the measured light amount to the calibration point setting means 55, which in turn will advise the controller 53, either to increase or decrease the driving current for the light-emitting diode 1, so that the calibration device will output a predetermined amount of light.

The setting of the driving current for the calibration device is preferably done by and adjusting the voltage V2 at the noninverting input of the first operational amplifier 31.

As an alternative to setting the driving current for the light-emitting diode 1 it will be possible to simply prepare a table displaying the relation between a respective calibration device and light detected by the light detector 51 while applying a driving current through the light-emitting diode 1.

This table can be used to recalibrate values obtained during use by a detection device in to which the calibration device under examination is inserted.

Although the invention has been described with reference to preferred embodiments, the present invention is not limited to these embodiments. For example, alternative configurations of the constant current generator 3 will be possible, as long as a reliable and constant small driving current in the claimed range can be obtained.

The invention claimed is:

1. A calibration device for an optical detector comprising:
a light emitting diode (1); and
an electronic circuit (3) for driving the light emitting diode (1);
wherein the electronic circuit (3) is a constant current generator (3) configured to supply a constant driving current to the light emitting diode (1) in the range of 0.5 to 25 µA
wherein the current generator (3) comprises a first operational amplifier (31) and a shunt resistor (33);
wherein the shunt resistor (33) is connected in series with the light emitting diode (1); and
wherein the first operational amplifier (31) is provided for supplying the constant driving current to the light emitting diode (1) and is connected to compare a set input voltage (V2) with a voltage obtained based on a voltage drop across the shunt resistor (31).

2. The calibration device according to claim 1, wherein the driving current is in the range of 1 to 10 µA, preferably 1.5 to 4.5 µA and most preferably 2 to 4 µA.

3. The calibration device according to claim 1, further comprising:
a diffusor (5) surrounding the light emitting diode (1).

4. The calibration device according to claim 1, further comprising:
a switching device (9) arranged so as to energise the light emitting diode (1) upon an axial compression of a pen like casing (7) accommodating the light emitting diode (1).

5. The calibration device according to claim 1, further comprising:
a setting unit (11) for setting the driving current.

6. The calibration device according to claim 5, wherein the setting unit (11) comprises an interface (13) for connecting an external current controller (53) for controlling the setting of the constant driving current based on a feed-back control using a light detector (51), for measuring the light output of the light emitting diode (1).

7. The calibration device according to claim 1, wherein the current generator (3) is configured to be switchable between a plurality of predetermined constant driving currents.

8. The calibration device according to claim 1, wherein the current generator (3) further comprises a second operational amplifier (35) connected as a low pass filter at a first node between the output of the first operational amplifier (31) and the shunt resistor (33).

9. The calibration device according to claim 8, wherein the current generator (3) further comprises a third operational amplifier (37) connected as voltage follower at a node between the shunt resistor (33) and the light emitting diode (1).

10. The calibration device according to claim 9, wherein the outputs of the second and third operational amplifiers (35, 37) are connected via respective resistors (R5, R7, R9) with the inverting input of the first operational amplifier (31).

11. A setting device for setting at least one calibration point for a calibration device according to claim 1, comprising:
- a light detector (51) configured to output a signal representing the light emission intensity of a calibration device under examination;
- a controller (53) for controlling the constant driving current of the calibration device under examination; and
- a calibration point setting means (55) for setting at least one calibration point for the calibration device under examination.

\* \* \* \* \*